Figure 1:
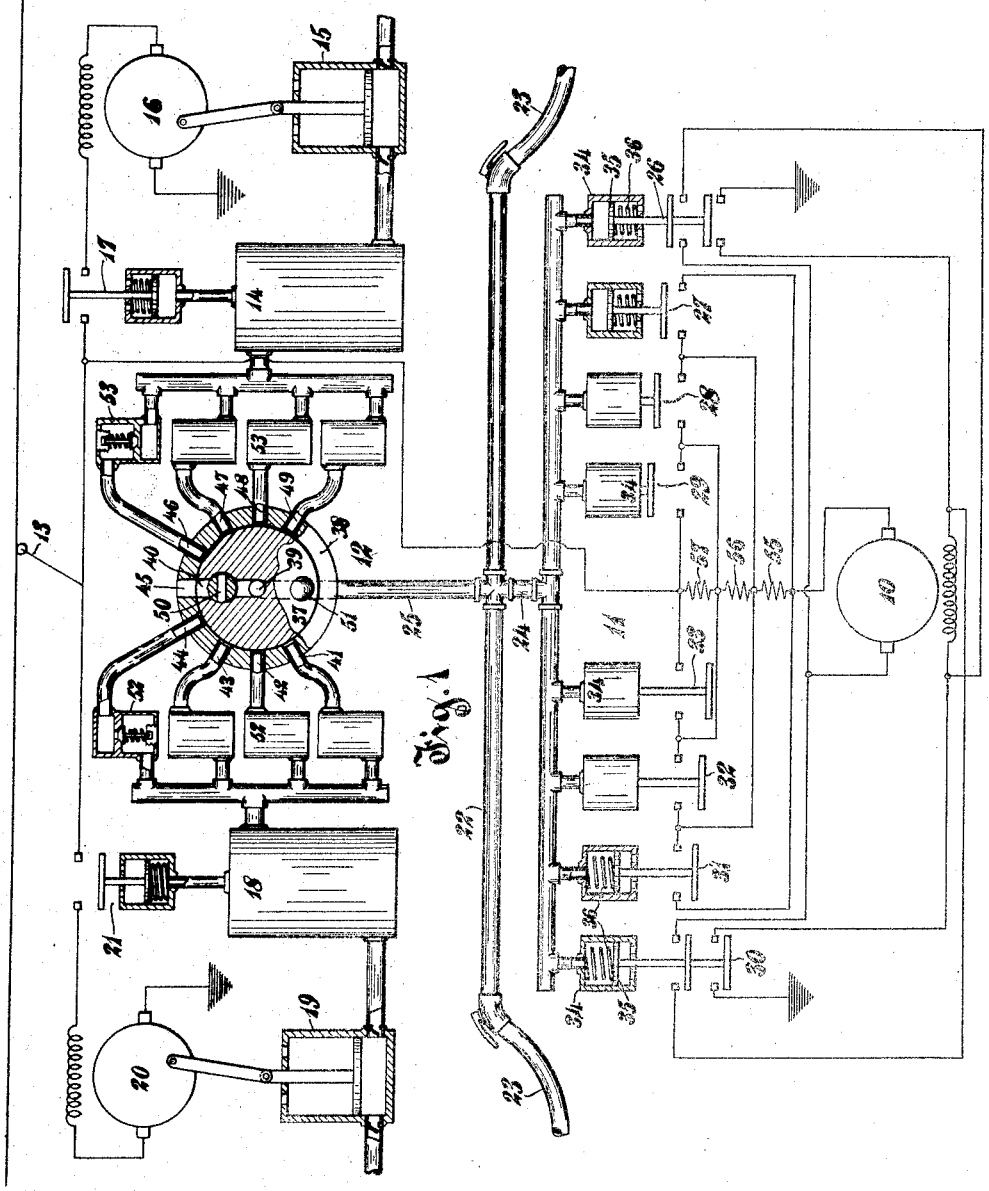

No. 876,594. PATENTED JAN. 14, 1908.
G. B. SCHLEY.
CONTROL SYSTEM.
APPLICATION FILED DEC. 31, 1906.

2 SHEETS—SHEET 1.

Witnesses
Oliver J. Sharman
Fred J. Kinsey

Inventor
George B. Schley
By
Chas. E. Lord
Attorney

No. 876,594. PATENTED JAN. 14, 1908.
G. B. SCHLEY.
CONTROL SYSTEM.
APPLICATION FILED DEC. 31, 1906.
2 SHEETS—SHEET 2.
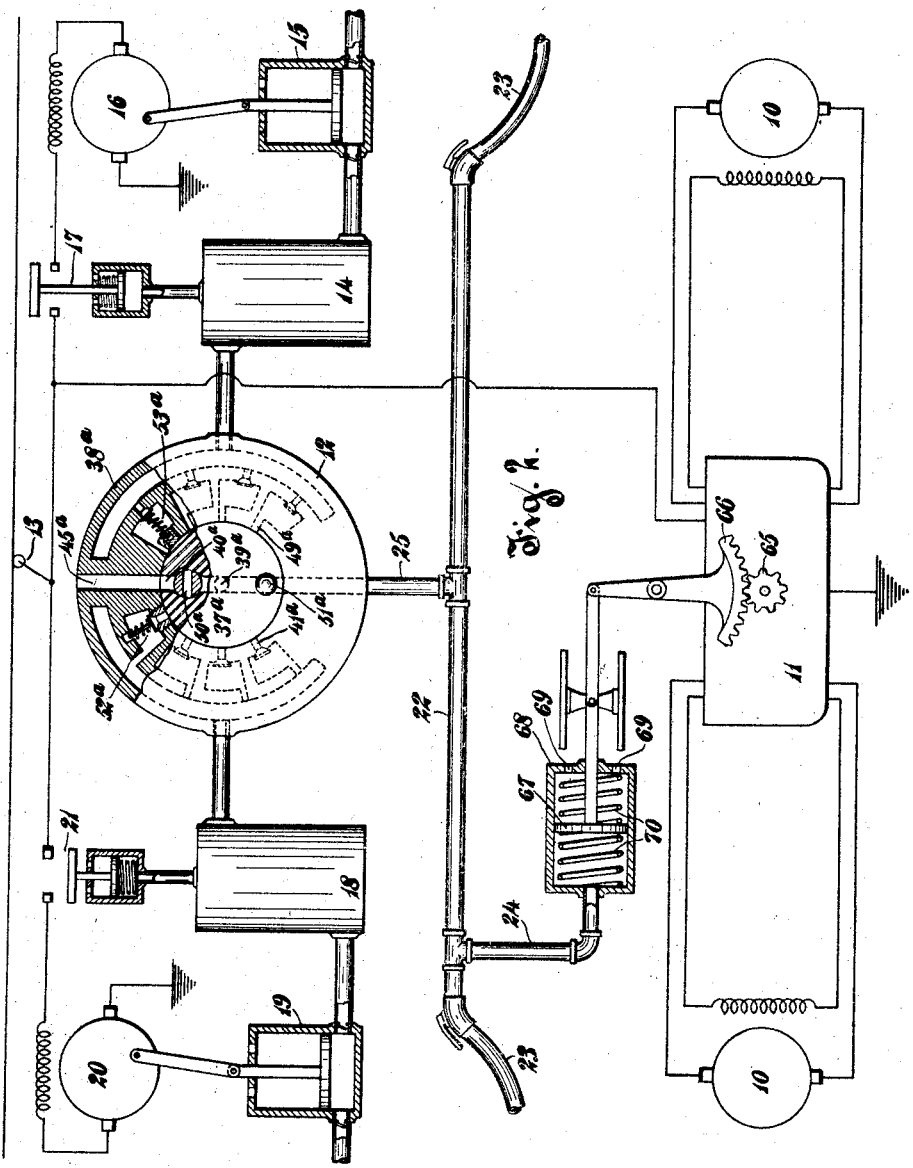
Witnesses
Oliver W. Sharman
Fred J. Kinsey
Inventor
George B. Schley
By
Chas. E. Lord
Attorney

UNITED STATES PATENT OFFICE.

GEORGE B. SCHLEY, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

CONTROL SYSTEM.

No. 876,594.    Specification of Letters Patent.    Patented Jan. 14, 1908.

Application filed December 31, 1906. Serial No. 350,129.

*To all whom it may concern:*

Be it known that I, GEORGE B. SCHLEY, citizen of the United States, residing at Norwood, in the county of Hamilton and State of Ohio, have invented certain new and useful Improvements in Control Systems, of which the following is a full, clear, and exact specification.

My invention relates to motor control systems and especially to multiple-unit train-control systems.

A number of systems have been devised for governing a plurality of pneumatically operated main controllers on different cars of a train from any one of a number of master controllers. In all of these, so far as I am aware, it has been necessary to provide at least two pipes extending throughout the length of the train.

It is the object of my present invention to obtain complete control of the main controllers on all of the cars of a train from any one of the master controllers by means of a single train pipe.

With this object in view, my invention in one of its aspects comprises the combination in a multiple-unit train control system, of a single train pipe extending throughout the train, and means for controlling the motor circuits of the several cars to forward, stop or reverse conditions therefrom.

In another aspect my invention comprises the combination in a motor control system, of a motor, a fluid-operated main controller therefor, and a master controller for varying the fluid pressure applied to said controller, the main controller being arranged to control the motor for movement in one direction upon an increase of said applied pressure above a predetermined value, and in the other direction upon a decrease in said pressure below said predetermined value.

Many other features of my invention will appear from the description and drawings and will be particularly pointed out in the claims.

Figure 1 shows diagrammatically one embodiment of my invention; and Fig. 2 shows a modification.

Referring now to the drawings, 10 represents the motor or motors to be controlled, 11 a pneumatically operated main controller therefor, and 12 a master controller for the main controller. Operating current is supplied through a trolley 13.

A reservoir 14 is supplied with compressed air or other fluid by a pump 15 driven by a motor 16. The motor 16 is controlled by a pressure-operated switch 17, responsive to the pressure in the reservoir 14 to keep said pressure approximately constant. A reservoir 18 has air or other fluid exhausted therefrom by means of a pump 19 driven by a motor 20. The motor 20 is controlled by a pressure-operated switch 21, responsive to the degree of exhaustion in the reservoir 18 to maintain said exhaustion approximately constant. The switch 17 closes to start the motor 16 upon a decrease in pressure in the reservoir 14 and opens to stop said motor upon an increase in such pressure, while the switch 21 closes to start the motor 20 upon an increase in the pressure in the reservoir 18 and opens to stop said motor upon a decrease in such pressure. The values at which the switches 17 and 21 operate respectively may be set at anything desired. These pressure switches may be of any well known form, being preferably snap switches.

There is a single pipe 22 extending throughout the length of the train or other system to be controlled. The pipes on adjacent cars of the train are connected by the usual flexible connections 23. On each car the train pipe 22 is connected to the main controller 11 by a pipe 24 and to the master controller 12 by a pipe 25. So far the description has related equally well to both figures of the drawings.

In the modification shown in Fig. 1 the main controller 11 comprises a plurality of separate pneumatically-actuated switches 26 to 33 inclusive. As shown, the operating means for each of these switches includes a cylinder 34 in which is a piston 35 connected to the switch. Within each of the cylinders 34 is a spring 36 which tends to open its associated switch. On one side of the piston 35, each cylinder 34 is connected to the pipe 24, and on the other side of the piston to a source of constant fluid pressure, as the atmosphere. The switches 26 to 33 inclusive are arranged to be all open when the fluid in the train pipe and in the pipe 24 is at a predetermined pressure, here taken as equal to atmospheric pressure. The switches 26 to 29 close as the fluid in the train pipe reaches successively higher pressures above such predetermined pressure, while the switches 30 to 33 close as said fluid reaches successively lower pressures below such predetermined pressure. Any desired method of obtaining this successive action may be used, such as varying the distances which the switches must travel in order to close. The switches 26 and 30 respectively close the motor circuit for rotation in opposite directions. The difference between the connections of the two switches is merely that the current in one element, as the field, of the motor or motors to be controlled is reversed. In Fig. 1 only one motor is shown, but obviously any desired number of motors may be used. The master controller 12 consists of a disk 37 fitting within a ring 38 to rotate therein. The disk 37 has a central opening 39 connecting the pipe 25 and a radial opening 40. In the ring 38 are a number of radial openings 41 to 49 inclusive. The opening 45 is connected to the atmosphere, or other source of constant fluid pressure. The openings 41 to 44 are connected through pressure-reducing valves 52 to the reservoir 18, the different valves 52 being adjusted so that the openings 41 to 44 have successively higher pressures, all lower than atmospheric pressure. The openings 46 to 49 are connected through pressure-reducing valves 53 to the reservoir 14, the different valves 53 being adjusted so that the openings 46 to 49 have successively higher pressures, all higher than atmospheric pressure. Normally the opening 40 connects with the opening 45 as shown. The disk 37 can be rotated, as by means of a removable handle 51, to bring the opening 40 opposite any of the openings 41 to 49 inclusive. A valve 50 is located in the opening 40, this valve being open when that master controller is being used and closed at other times. If desired the valve 50 may be arranged to be opened and closed respectively by putting on and taking off the handle 51.

The operation of the system is as follows:—
The valve 50 on the master controller to be used to control the trains is opened, all the other valves 50 being closed. When the disk 37 of this controller is in its normal position and the openings 40 and 45 are connected, the train pipe 22 is connected to the atmosphere and the switches 26 to 33 inclusive throughout the train are all open as shown. When movement in one direction is desired the disk 37 of the master controller is moved to bring the opening 40 opposite the opening 46, thus supplying to the train pipe a pressure slightly higher than that of the atmosphere. This increased pressure causes all of the switches 28 to 33 inclusive to move downward unless they have reached their limit of movement, and is sufficient to close the switch 26 on all the cars of the train while bringing the switches 27, 28 and 29 nearer to closed position. The closing of the switch 26 completes the circuit of the motor 10 through the resistance sections 55, 56 and 57 and causes the train to start. When the disk 3, is moved further in the same direction to bring the openings 40 and 47 opposite each other a still higher pressure is let into the train pipe 22 and the switches 27 on all the cars operate to cut out the first resistance section 55, and increase the speed of the train. As the opening 40 in the disk 37 is successively brought opposite the openings 48 and 49 the switches 28 and 29 are successively operated to cut out the remaining resistance sections, thus further increasing the speed of the train. When it is desired to stop, the disk 37 is returned to its normal position, and the train pipe thus being connected to the atmosphere through the opening 45, all of the switches which have been closed are opened. When movement of a car or train in the other direction is desired the disk 37 is moved to bring the opening 40 successively opposite the openings 44 to 41 inclusive, thus successively diminishing step-by-step the pressure in the train pipe and causing the operation of the switches 30, 31, 32 and 33 in the order named. The closing of the switch 30 completes the motor circuit for rotation in the desired direction, while the switches 31, 32 and 33 respectively cut out the resistance sections 55, 56 and 57. As before, the train may be stopped by bringing the disk 37 back to its normal position and connecting the train pipe to the atmosphere. Should the train happen to break and the connections between the pipes 22 on the different cars be interrupted, said pipes will be connected to the atmosphere and the main controllers 11 brought to their "off" position, causing the train to stop. Throughout the operation as described above, the pressures in the reservoirs 14 and 18 respectively are kept constant by the motor-driven pumps 15 and 19 respectively, controlled by the pressure switches 17 and 21 respectively. This method of keeping constant the pressure in a reservoir is old and well known and needs no further explanation here. If desired other methods of obtaining these constant pressures may be used. In fact, by means of suitable arrangements the various constant pressures may if desired be all either above or below atmospheric pressure.

Referring now to Fig. 2, the reference characters 11 to 25 denote the same elements as in Fig. 1. In Fig. 2, however, the main controller 11 is not composed of a plurality of separately actuated contacts, but is of the drum or other similar type, and is arranged to have a neutral or "off" position and to move in opposite directions from such position for forward and backward movements of the car or train respectively. This controller is operated through a pinion 65 and a gear segment 66 by a piston 67 in a cylinder 68. The space to the left of the piston 67 is connected to the pipe 24 and through it to the train pipe 22, while the space at the right of said piston is connected to the atmosphere through openings 69. A spring or springs 70 maintain the piston 67 and the controller 11 in their central or neutral positions when the pressure in the train pipe 22 is at its normal predetermined value, here equal to that of the atmosphere. The master controller in Fig. 2 consists of a movable disk 37ª fitting rotatably within a ring 38ª. The disk 37ª has openings 39ª and 40ª similar to the openings 39 and 40 in Fig. 1. The opening 40ª may be brought opposite any one of the openings 41ª to 49ª inclusive, the opening 45ª being connected to the atmosphere. the openings 41ª to 44ª to the reservoir 18 through pressure-reducing valves 52ª and the openings 46ª to 49ª to the reservoir 14 through pressure-reducing valves 53ª. In Fig. 2, however, the pressure-reducing valves are shown built into the master controller instead of being separate therefrom as in Fig. 1. In the opening 40ª is a shut-off valve 50ª. The disk 37ª is operated by the removable handle 51ª. As the disk 37ª is moved clockwise or counter-clockwise, the pressure in the train pipe 22 is successively raised or lowered and the piston 67 is moved either to the right or to the left accordingly. Movement to the right from the neutral or middle position causes the pinion 65 to be moved counter-clockwise to connect the motor 10 for movement in one direction. Continued movement of the piston 67 with its connected controller drum or drums causes higher speeds of the motors 10 to be obtained, these motors being connected in any desired manner to accomplish this end. When the piston 67 is moved to the left from its middle position, the pinion 65 is moved in a clockwise direction, connecting the motors 10 for movement in the other direction and varying the speed of the motors 10 in any desired manner. Instead of having a plurality of pressure-reducing valves 52 and 53 there may be but a single valve of this kind, the spring of this valve being adjustable by movement of the handle 51 to get the desired pressure in the train pipe 22.

Many other modifications in the precise arrangements here shown and described may be made without departing from the spirit and scope of my invention and all such I aim to cover in the following claims.

What I claim as new and desire to secure by Letters Patent is:—

1. In a multiple unit control system, a single pipe extending throughout the train, and means for controlling the motor circuits of the several cars for forward, stop or reverse conditions therefrom.

2. In a multiple unit control system, a single pipe extending throughout the train, and branch connections in the several cars for securing forward, stop or reverse conditions of the car motors by varying the fluid pressure in said pipe.

3. In a multiple unit control system, a single pipe extending throughout the train, branch connections therefrom within the several cars, and fluid-operated devices within the several cars and operable from the train pipe for setting the motors to forward, zero or reverse movement.

4. In a multiple unit control system, a single pipe extending throughout the train, fluid-operated devices within the several cars for controlling the speed and direction of the motors thereof, and branch connections from said pipe to said devices.

5. In a multiple unit control system, a single pipe extending throughout the train, fluid-operated devices within the several cars for controlling the motor circuits thereof, and branch connections from said pipe to said devices for arranging said motor circuits in any desired relation by varying the fluid pressure in said pipe.

6. In a multiple unit control system, fluid-operated devices within the several cars for controlling the motor circuits thereof, and a single train pipe so connected to said devices that by varying the fluid pressure in said train pipe, the speed and direction of the motors may be controlled.

7. In a motor control system, a motor, a fluid-operated main controller, a master controller, and a single pipe connecting the main controller and the master controller, said master controller being arranged to vary the fluid pressure in said pipe, and said main controller being responsive to such changes to connect the motor for different speeds.

8. In a motor control system, a motor, a fluid-operated main controller, a master controller, and a single pipe connecting the main controller and the master controller, said master controller being arranged to vary the fluid pressure in said pipe, and said main controller being responsive to such changes to connect the motor for movement in different directions.

9. In a motor control system, a motor, a fluid-operated main controller, a master controller, and a single pipe connecting the main controller and the master controller, said master controller being arranged to vary the fluid pressure in said pipe, and said main controller being responsive to such changes to connect the motor for movement in different directions and at different speeds.

10. In a motor control system, a motor, and a fluid-operated main controller therefor, said controller being arranged to vary the speed of the motor in one direction in accordance with increases above a predetermined value of the fluid pressure applied thereto and to vary the speed of the motor in the other direction in accordance with decreases of said fluid pressure below said predetermined value.

11. In a motor control system, a motor, a fluid-operated main controller therefor, and a master controller for varying the fluid pressure applied to said main controller, the main controller being arranged to control the motor for movement in one direction in accordance with increases above a predetermined value of the fluid pressure applied thereto and in the other direction in accordance with decreases of said pressure below said predetermined value.

12. A motor control system comprising a plurality of motors, and a plurality of fluid-actuated main controllers therefor, each of said main controllers being arranged to vary the speed of the motor or motors associated therewith in one direction in proportion to the increase above a predetermined value of the fluid pressure supplied thereto, and to vary the speed of said motor or motors in the other direction in proportion to the decrease of said pressure below said predetermined value.

13. A motor control system comprising a plurality of motors, a plurality of fluid-actuated main controllers therefor, each of said main controllers being arranged to vary the speed of the motor or motors associated therewith in one direction in accordance with the increase above a predetermined value of the fluid pressure applied thereto, and to vary the speed of said motor or motors in the other direction in accordance with the decrease of said pressure below said predetermined value, and a master controller for varying the pressure applied to all of the main controllers.

14. A motor control system comprising a plurality of motors, a plurality of fluid-actuated main controllers therefor, each of said main controllers being arranged to control the motor or motors associated therewith for movement in one direction upon an increase of the fluid pressure supplied thereto above a predetermined value, and to control said motor or motors for movement in the other direction upon a decrease of said pressure below said predetermined value, and a plurality of master controllers any one of which may vary the pressure supplied to all of said main controllers.

15. In a motor control system, a motor, and a fluid-actuated main controller therefor, said main controller being arranged to vary the speed and direction of the motor in accordance with the extent and direction of the variation from a predetermined value of the fluid pressure supplied thereto.

16. In a motor control system, a motor, a fluid-actuated main controller therefor, said main controller being arranged to vary the speed and direction of the motor in accordance with the extent and direction of the variation from a predetermined value of the fluid pressure supplied thereto, and a master controller for controlling the extent and direction of the variation of the fluid pressure supplied to said main controller.

17. A motor control system comprising a motor, and a fluid-actuated main controller therefor, said main controller being arranged to vary the speed of the motor in one direction as fluid pressure is supplied thereto and to vary the speed of the motor in the other direction as fluid pressure is exhausted therefrom.

18. A motor control system comprising a motor, a fluid-actuated main controller therefor, said main controller being arranged to control the motor for movement in one direction as fluid pressure is supplied thereto and to control the motor for movement in the other direction as fluid pressure is exhausted therefrom, and a master controller for controlling the supply and exhaust of fluid pressure for said main controller.

In testimony whereof I affix my signature in the presence of two witnesses.

GEORGE B. SCHLEY.

Witnesses:
RUBY ROBINSON,
FRED J. KINSEY.